(12) United States Patent
Wertz

(10) Patent No.: US 8,899,538 B2
(45) Date of Patent: Dec. 2, 2014

(54) GAME HANGING APPARATUS AND METHOD TO HANG A BODY FOR DISPLAY

(75) Inventor: Andy Wertz, Bryan, TX (US)

(73) Assignee: Andy Wertz, Bryan, TX (US)

( * ) Notice: Subject to any disclaimer, the term of this patent is extended or adjusted under 35 U.S.C. 154(b) by 860 days.

(21) Appl. No.: 12/972,172

(22) Filed: Dec. 17, 2010

(65) Prior Publication Data

US 2012/0151737 A1 Jun. 21, 2012

(51) Int. Cl.
*A47B 96/00* (2006.01)
*G09B 23/36* (2006.01)
*B32B 3/06* (2006.01)
*B32B 3/08* (2006.01)
*B32B 3/30* (2006.01)

(52) U.S. Cl.
CPC . *G09B 23/36* (2013.01); *B32B 3/06* (2013.01); *B32B 3/08* (2013.01); *B32B 3/30* (2013.01)
USPC ............ 248/225.11; 248/220.21; 248/220.22; 248/317; 248/477; 403/84

(58) Field of Classification Search
CPC ....... B60D 1/52; A47G 1/1606; A47G 7/044; A47G 1/1613; A47G 1/164; A47G 2001/207; A47B 95/008; A45F 5/02; A45F 2200/0575; B25H 3/04; Y10S 24/60
USPC ......... 248/477, 476, 479, 495, 496, 317, 323, 248/324, 339, 341, 220.21, 220.22, 694, 248/126, 682, 222.13, 223.41, 224.51, 248/224.61, 225.11, 223.21, 919, 920, 921, 248/922, 923, 125.3, 125.9; 403/84, 103
See application file for complete search history.

(56) References Cited

U.S. PATENT DOCUMENTS

| | | | | |
|---|---|---|---|---|
| 606,208 A * | 6/1898 | Gutmann | ................... | 248/311.2 |
| 999,961 A * | 8/1911 | Colas | ............................ | 248/498 |
| 1,169,013 A * | 1/1916 | Darling | .................... | 248/223.41 |
| 2,263,901 A * | 11/1941 | Olney | ........................... | 248/496 |
| 3,529,799 A * | 9/1970 | Schaefer | ...................... | 248/496 |

(Continued)

FOREIGN PATENT DOCUMENTS

DE 4215978 A1 * 11/1993 ............. F24D 19/02

OTHER PUBLICATIONS

Steve Hall, "Helping Hand Gamehead Hangers", www.taxidermy.com/cat/20/hand.html, May 4, 2010, 2 pages.

(Continued)

*Primary Examiner* — Kimberly Wood
(74) *Attorney, Agent, or Firm* — Streets & Steele; Patrick K. Steele; Jeffrey L. Streets

(57) ABSTRACT

An apparatus to hang a game trophy on a support structure and to facilitate adjustment of the orientation of the game trophy relative to the support structure comprising a first member, having a dog and a protruding peg with an enlarged head, and a saddle portion adjacent to the enlarged head, and a second member having a bay opening, a bay, a recess adjacent to the bay opening, and a plurality of generally adjacent dog recesses. A method of hanging a game trophy comprises receiving the enlarged head of the peg through the bay opening to align the saddle portion of the first member with the throat of the bay of the second member, and by then receiving the dog into an aligned dog recess of the second member to releasably couple the second member to the first member.

15 Claims, 8 Drawing Sheets

(56) References Cited

U.S. PATENT DOCUMENTS

| | | | |
|---|---|---|---|
| 4,437,639 A * | 3/1984 | Stein | 248/558 |
| 4,613,148 A * | 9/1986 | Scholte | 280/491.5 |
| 5,248,121 A * | 9/1993 | Harrington | 248/477 |
| 5,433,416 A | 7/1995 | Johnson | |
| 5,605,313 A * | 2/1997 | Erickson et al. | 248/467 |
| 5,957,421 A * | 9/1999 | Barbour | 248/220.21 |
| 7,655,318 B2 | 2/2010 | Hall | |
| 8,342,472 B2 * | 1/2013 | Gaudron et al. | 248/476 |
| 2005/0006554 A1 | 1/2005 | DeLine | |
| 2006/0038097 A1 * | 2/2006 | Diller | 248/218.4 |

OTHER PUBLICATIONS

"Trophy Self-Locking Hangers", www.taxidermy.com/cat/20/trophy.html, May 15, 2010, 2 pages.

"T-HANG", T Hanger System, www.mckenziesp.com/T-HANG-P13948C2116.aspx, May 4, 2010, 1 page.

"Super Lock Hanger", Ultimate Super Lock Hanger Unit, Panel Accessories, Panes and Display at Van Dykes Taxidermy, www.vandykestaxidermy.com/product/42000100/ultimate-super-lock-hanger-unit, Jul. 20, 2010, 3 pages.

* cited by examiner

GAME HANGING APPARATUS AND METHOD TO HANG A BODY FOR DISPLAY

BACKGROUND OF THE INVENTION

1. Field of the Invention

This application relates to an apparatus to support a taxidermied game body, such as, for example, the head of a large animal that is mounted and/or reproduced in a manner suitable for display. This application relates to a method to display a taxidermied body.

2. Brief Description of the Related Art

Taxidermy is the art of mounting skins and/or the head of an animal so that it has a lifelike appearance, or the act of mounting or reproducing a portion of a dead animal, especially game, to facilitate display or study. Taxidermy can be done on all vertebrate species of animals including mammals, birds, reptiles and amphibians, but is most applied to mammals such as, for example, deer, antelope, caribou, bighorn sheep, rams, longhorns, bulls, wildebeest, bison, buffalo, elk, moose, cougar, bear and others.

Some animals may be very large, and the taxidermied portion of the animal may weigh 200 pounds (90.0 kg) or more, thereby making the display of the taxidermied body very difficult and making mounting of the taxidermied body on a wall potentially hazardous. It is desirable to use a hanging apparatus and method that conceals or at least obscures the hanging apparatus so as to focus the observer on the beauty of the taxidermied body without distracting the observer with exposed components of the hanging apparatus. A taxidermied body may engage a support structure, such as a wall, column or board, flush around the entire perimeter of the taxidermied body to completely conceal the hanging apparatus. The hanging apparatus should be resistant to being inadvertently disengaged from, or misaligned on, the support structure when bumped or jarred such as, for example, an earthquake, a violent windstorm or just a clumsy observer.

The hanging apparatus and method should also provide for safe and convenient hanging of the taxidermied body on a support structure. A large body may exceed 200 pounds (90.0 kg) or more, and it may be very difficult to hoist, hold steady and then engage a component on the taxidermied body with a hook, nail or other receiving device on the support structure. Conventional apparatuses such as wall anchors may be difficult to align because the component on the taxidermied body and the receiving device on the support structure may be difficult or impossible to see as the body is moved to the display position. Many hanging apparatuses comprise a small aperture to receive by insertion a hook, peg or other protruding structure, and proper alignment is especially difficult where the taxidermied body is large and/or heavy.

Another problem associated with conventional hanging apparatuses and methods relates to the orientation and positioning of the body once it is hung on the support structure. Taxidermied bodies are, by their nature, asymmetrical because they are portions of a beast that have been treated, conditioned and mounted. Also, a well-taxidermied body may provide a tilt or rotation of the head to present a natural pose of the animal for enhanced beauty. Such lifelike positions may introduce to the taxidermied body a center of mass that, when acted upon by gravity, will cause the body to rotate from a desired display position. For these reasons, it may be difficult for the taxidermist to attach a component of a hanging device to the taxidermied body in perfect alignment with the center of gravity of the taxidermied body because there is no means of determining the exact center of gravity or of marking the exact center of gravity were it to be determinable. As a result, it may be very difficult to determine if the component of the hanging apparatus is properly aligned with the center o gravity of a taxidermied body until the taxidermied body is displayed on a support structure and viewed from a distance.

What is needed is a game hanging apparatus for hanging a taxidermied body that requires less than an exacting alignment of a component of an apparatus secured to the taxidermied body with the center of gravity of the taxidermied body. What is needed is a game hanging apparatus that can accommodate a natural pose of taxidermied body and still maintain and support the taxidermied body on a support structure and in an attractive orientation relative to the support structure. What is needed is a game hanging device that facilitates adjustment to the orientation and position of the taxidermied body while substantially reducing the possibility of the taxidermied body falling on the person hanging and/or adjusting the taxidermied body for display. What is needed is a method to hang a heavy and/or large taxidermied body on a support structure and one that permits adjustment of the orientation and position of the taxidermied body without disengaging the taxidermied body from the support structure.

SUMMARY OF THE INVENTION

Embodiments of this invention satisfy the aforementioned needs. In a first embodiment, a game hanging apparatus comprises a body member, having a bay, a bay opening, a recess within the bay and a plurality of generally adjacent dog recesses thereon, and a wall member, having dog generally adjacent a peg having an enlarged head and a base. The body member is securable to a taxidermied body and the wall member is securable to a support structure which may be a wall, a post, a column, a beam or some other structure to support the taxidermied body for display.

The wall member and the body member are adapted for being joined or docked one with the other by receiving the enlarged head of the peg of the wall member through the bay opening on the body member so that the enlarged head of the peg is generally vertically aligned with a recess, channel or space between the bay opening and the body. The dog of the wall member may be aligned with and received into at least one of the plurality of generally adjacent dog recesses of the body member as the taxidermied body to which the body member is secured is lowered to position a throat of the bay opening (on the body member) on a saddle portion of the peg (on the wall member) intermediate the enlarged head and the base of the peg. In this seated position, the dog of the wall member is received at least partially within at least one aligned dog recess of the body member, and the throat of body opening is seated on the saddle portion of the peg to releasably couple the taxidermied body to the support structure.

The orientation of the taxidermied body is maintained by resistance to rotation resulting from the dog of the wall member being received into at least one generally aligned recess of the body member. In the event that the orientation of the taxidermied body was not aesthetically pleasing or properly aligned for optimal display, the orientation of the taxidermied body may be adjusted relative to the support structure. For example, but not by way of limitation, if the orientation of the taxidermied body were to be counterclockwise from an optimal or desired orientation, the taxidermied body can be reoriented or aligned by first the steps of raising the taxidermied body and the body member secured thereto an amount sufficient to withdraw the dog of the wall member from the aligned dog recess on the body member, rotating and/or re-orienting the taxidermied body and the body member secured thereto through a clockwise angular displacement sufficient to align the dog of the wall member with at least another of the generally adjacent dog recesses on the body member, and lowering the taxidermied body and the body member thereon to receive the dog of the wall member into the now-aligned dog recess on the body member. Once the taxidermied body is released and the load of the taxidermied body is supported by the support structure, the weight of the taxidermied body maintains the dog in the now-aligned dog recess on the body member to maintain the taxidermied body in the optimal or desired angular orientation and to resist misalignment by movement or vibration of the support structure and/or inadvertent jarring or bumping by a clumsy observer. It should be understood that the distribution of the load of the body to the components of the wall member generally depends on the physical configuration of the wall member and the body member. In one embodiment, all of the load of the body and the body member is transferred to the wall member at the interface of the throat of the bay opening of the body member with the saddle portion of the peg intermediate the enlarged head portion and the base of the wall member. In this embodiment, the dog of the wall member is merely received into an aligned dog recess of the body member without the dog engaging an end of the recess. In another embodiment, at least a portion of the load may be borne by the dog of the wall member due to contact with the end of the aligned dog recess of the body member into which the dog is received, with the remaining portion of the load borne by the saddle portion of the peg intermediate the enlarged head and the base of the wall member and at the interface with the throat of the bay opening.

It should be understood that the body member may be coupled to one or more other components to facilitate secure fastening of the body member to the taxidermied body, and that the wall member may be coupled to one or more other components to facilitate secure fastening of the wall member to the support structure. In one embodiment the body member may comprise a generally planar base adapted to be secured to an adjacent planar member, and the wall member may comprise a wall base portion that is generally planar and adapted to be secured to an adjacent and generally planar member, such as a wall, column, post, ceiling or other support structure. In each instance, the generally planar member may be disposed intermediate the body member or wall member and the taxidermied body or support structure, respectively. For example, but not by way of limitation, the body member may be secured to a small, rectangular and generally planar mounting plate that may comprise metal, wood or some other material that can be securely fastened using, for example, adhesives or fasteners, to a base or member of the taxidermied body. Similarly, the wall member may be secured to a small, rectangular and generally planar plate that can be secured fastened to the support structure using, for example, nails or screws. Any number or arrangement of additional components may be provided to facilitate securing of the body member to the taxidermied body or of the wall member to the support structure. It should further be understood that the body member and/or the wall member may be integrally formed structures or, alternately, the body member and/or the wall member may comprise a plurality of components coupled or assembled. For example, a body member may comprise a bay opening in a plate that is coupled to a base member so that the bay opening is disposed in a spaced-apart relationship to a surface of the base member to which the plate is coupled, and there may be one or more spacers disposed between the plate and the surface of the base member to maintain the spacing therebetween. The plate may be fastened to the surface of the base member using one or more fasteners, such as screws, in a manner to capture the spacer(s) therebetween. In this example, the fasteners, the spacer(s), the plate and the base member may all be assembled from separate components to form a body member or, alternately, the body member may be integrally formed from a single piece of a material that can be machined and formed. It will be further understood that manufacturing costs may be reduced by forming the body member and/or the wall member by assembly of components.

The foregoing and other features and aspects of embodiments of the invention will be best understood with reference to the following detailed description of one or more specific embodiments, when read in conjunction with the accompanying drawings, which illustrate some embodiments of the invention, wherein:

DETAILED DESCRIPTION OF AN EMBODIMENT

Figure 1:
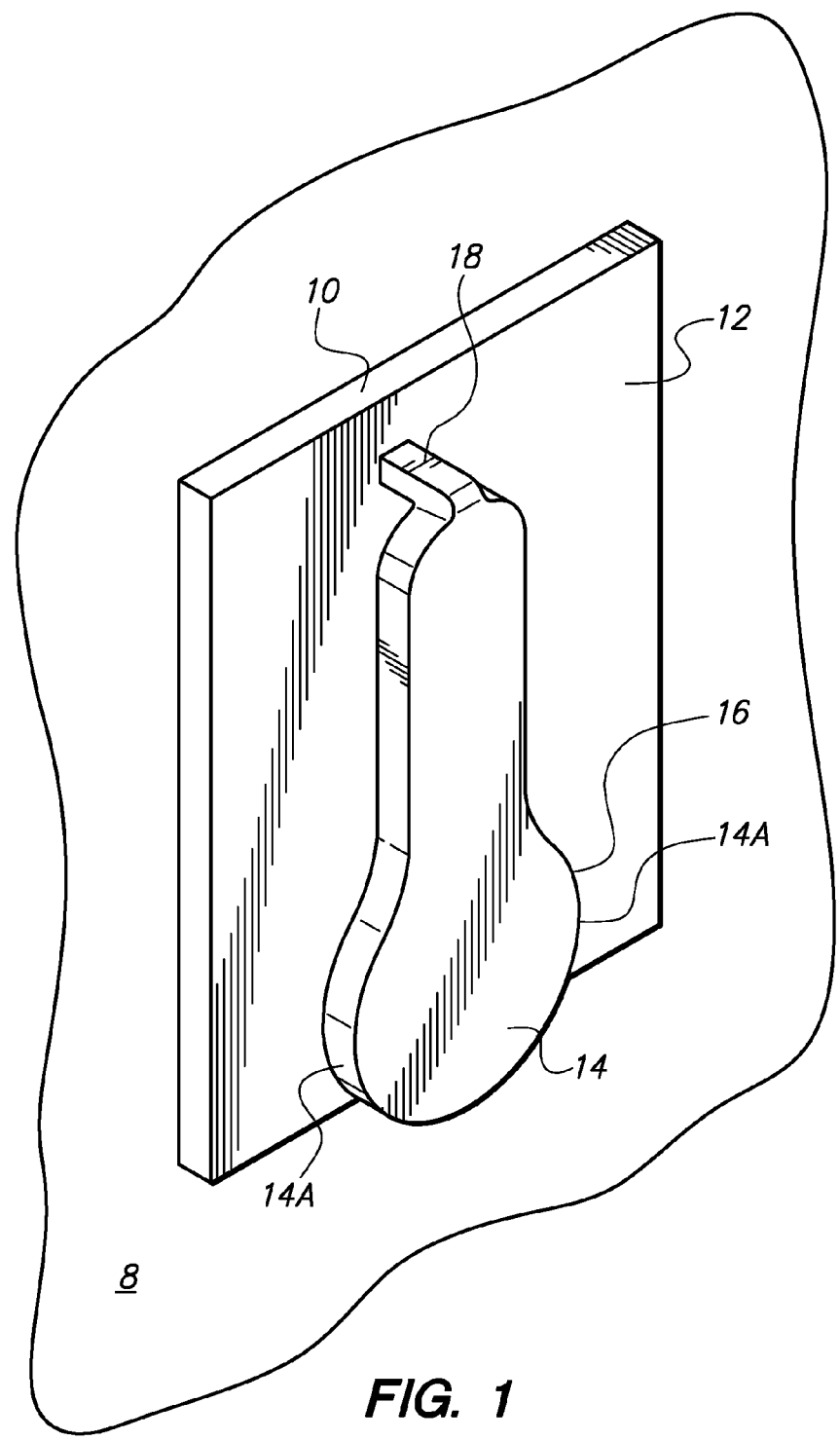
FIG. 1 is a perspective view of one embodiment of a wall member of an apparatus for hanging a body. The wall member illustrated in FIG. 1 comprises a dog and a peg having an enlarged head thereon, both coupled to a base member.

FIG. 1 is a perspective view of one embodiment of a wall member 10 of an apparatus for hanging a body. The wall member 10 illustrated in FIG. 1 comprises a dog 18 and a peg 14 having an enlarged head 16 thereon, both coupled to a base member 12 that is securable to a support member 8. The dog 18 and peg 14 illustrated in FIG. 1 are illustrated as being integral one with the other, but these structures may, in other embodiments, be separate one from the other. The enlarged head 16 of the peg 14 comprises a portion having a maximum span 14A that will provide for stability of the apparatus, as will be described in greater detail below.

It should be understood that, in some embodiments, the dog 18 of the wall member 10 may comprise a first portion disposed within the general plane of the enlarged head 16 of the peg 14 and a second portion extending out of the general plane of the enlarged head 16 of the peg 14 as illustrated in FIG. 1 which illustrates the dog 18 extending inwardly from the general plane of the enlarged head 16 of the peg 14 and towards the base member 12. In other embodiments, the dog 18 may lie generally within the same plane as the enlarged head 16 of the peg 14 with no portion extending out of the general plane of the enlarged head 16. It should be understood that, in still other embodiments, the dog 18 may extend from the general plane of the enlarged head 16 of the peg 14 and outwardly from the plane of the enlarged head 16 of the peg 14 and away from the base member 12 and, in still other embodiments, the dog 18 need not comprise a portion that lies in the same general plane as the enlarged head 16 of the peg 14. The dog 18 needs only to be positioned so that it is alignable with and is receivable into one of two or more dog recesses of the body member as described in more detail below in connection with FIG. 2.

Figure 2:
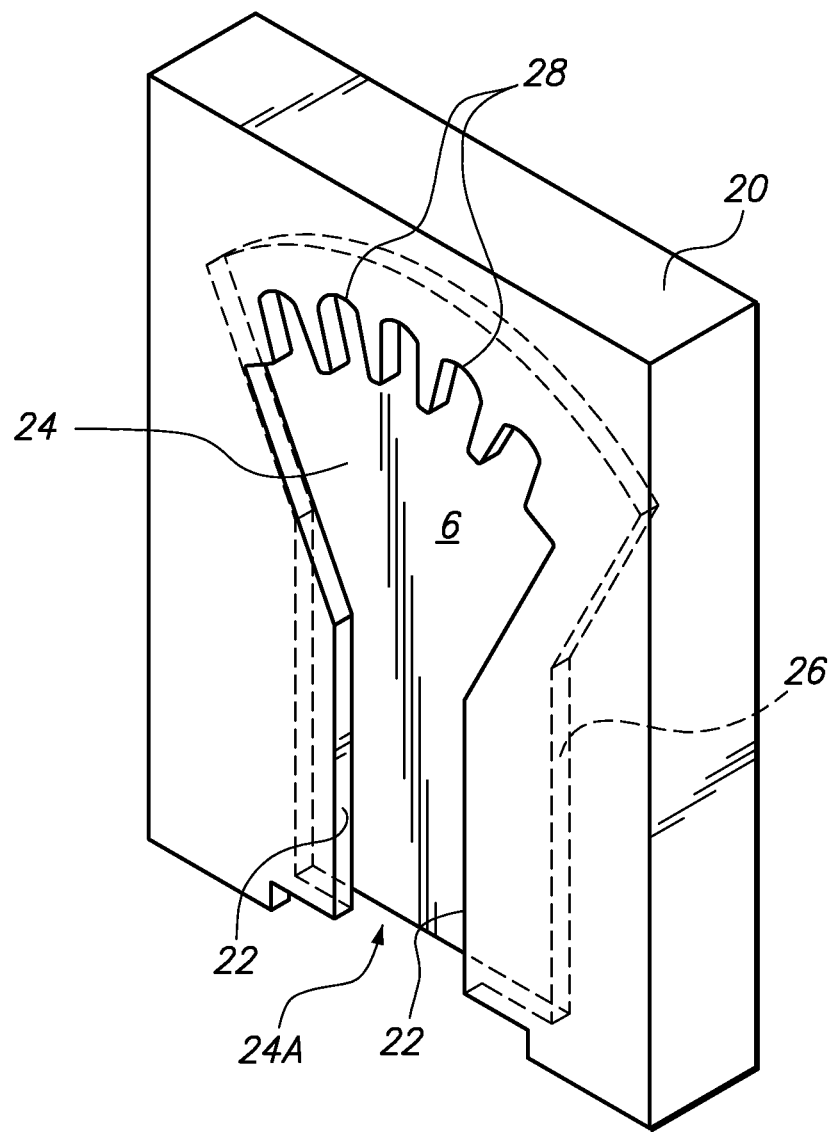
FIG. 2 is a perspective view of one embodiment of a body member of an apparatus for hanging a body. The body member illustrated in FIG. 2 comprises a plurality of generally adjacent dog recesses, a bay opening, a bay with a throat therein and a recess intermediate the bay opening and a surface.

FIG. 2 is a perspective view of one embodiment of a body member 20 of an apparatus for hanging a body. The body member 20 illustrated in FIG. 2 is adapted for docking with the wall member of FIG. 1 as described in more detail below, and comprises a plurality of generally adjacent dog recesses 28, a bay 24, a bay opening 22 with a throat 24A therein and a recess 26 intermediate the bay opening 22 and a surface 6.

In some embodiments, such as that illustrated in FIG. 2, the plurality of generally adjacent dog recesses 28 of the body member 20 may generally lie one adjacent the others and in the same general plane as the bay opening 22 of the body member 20, as illustrated in FIG. 2. In other embodiments, the plurality of generally adjacent dog recesses 28 may generally lie in a plane that is offset from the bay opening 22 of the body member 20, either inwardly towards the surface 6 or outwardly and away from the surface 6. Similarly, the dog 18 of FIG. 1 is illustrated as extending inwardly toward the base member 12 of the wall member 10 and out of the plane of the enlarged head 16 of the peg 14 of the wall member 10. In other embodiments, the dog 18 may lie generally within the same plane of the enlarged head 16 of the peg 14. In still other embodiments, the dog 18 may extend outwardly away from the base member 12 of the wall member 10 and out of the plane of the enlarged head 16 of the peg 14 of the wall member 10. The plurality of generally adjacent dog recesses 28 of the body member 20 need only to be positionable relative to the dog 18 of the wall member 10 such that at least one of the two or more dog recesses 28 of the body member 20 are generally alignable with at least a portion of the dog 18 of the wall member 10, an embodiment of which is illustrated in FIG. 1, to receive the at least a portion of the dog 18 within an aligned dog recess 28 to restrain the body member 20 against rotational movement relative to the wall member 10, as will be further described below in connection with FIGS. 3 and 4.

Figure 3:
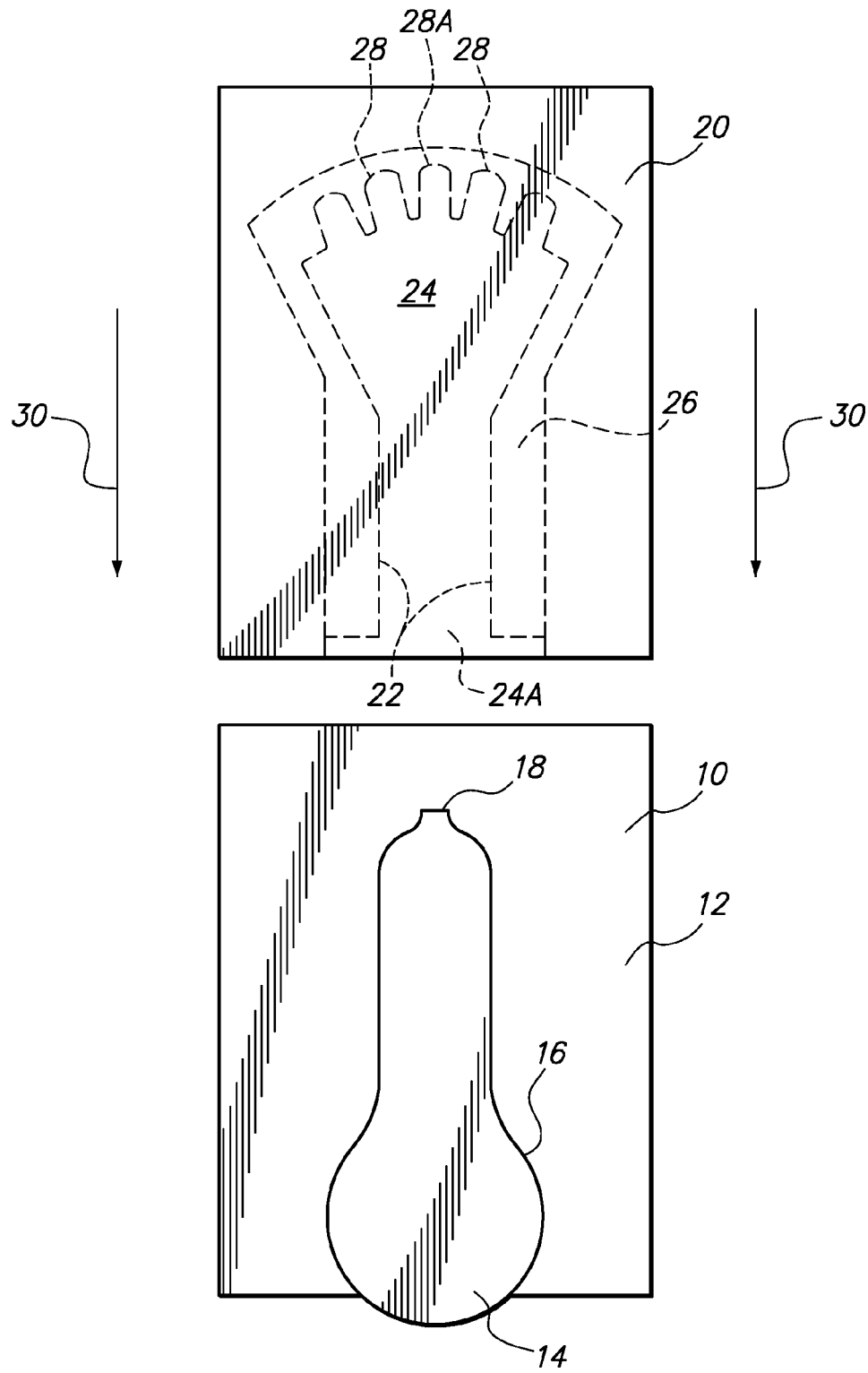
FIG. 3 is a an elevation view of the wall member of FIG. 1 in an aligned relationship with the body member of FIG. 2 to receive, upon movement of the body member in the downward direction onto the wall member, the dog of the wall member into an aligned dog recess of the body member and to receive a saddle portion of the peg intermediate an enlarged head of the peg and a base of the peg into a bay of the body member.

FIG. 3 is a an elevation view of the wall member 10 of FIG. 1 in an aligned relationship with the body member 20 of FIG. 2 to receive, upon movement of the body member 20 in the downward direction indicated by the arrow 30, to a docked position on the wall member 10. The dog 18 of the wall member 10 is aligned to be received into the center aligned dog recess 28A of the plurality of aligned dog recesses 28 of the body member 20, and the saddle portion 13 (not shown in FIG. 3—see FIG. 4A) of the peg 14 that is intermediate the enlarged head 16 of the peg 14 and a surface 12 is aligned to be received into the throat 24A of the bay opening 22 of the body member 20. It should be noted that the throat 24A, the bay opening 24A, the bay 24 and the dog recesses 28 of the body member 20 are shown in dotted lines in FIG. 3 because the body member 20 faces into the drawing and these structures are positioned to receive and to dock with the illustrated corresponding structures on the body member 10.

Figure 4:
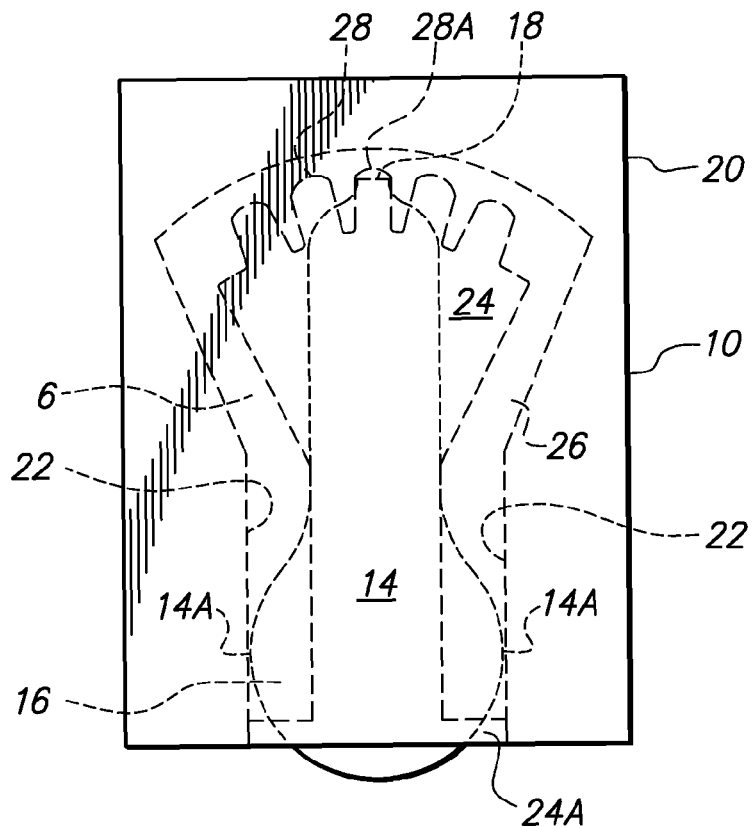
FIG. 4 is the body member of FIG. 2 docked with and received on the wall member of FIG. 1 after movement of the body member onto the wall member as described in connection with the illustration of FIG. 3 and after docking of the body member on the wall member to prevent or limit rotation of the body member relative to the wall member.

FIG. 4 is the body member 20 of FIG. 2 docked with and received on the wall member 10 of FIG. 1 after movement of the body member 20 from the position illustrated in FIG. 3 onto the wall member 10 as described in connection with the illustration of FIG. 3 and after docking of the body member 20 on the wall member 10 to prevent or limit rotation of the body member 20 relative to the wall member 20. The recess 26 of the body member 20 (also illustrated in FIG. 2) is disposed between the bay opening 22 and the surface 6 of the body member 20, and that the recess 26 of the body member 20 slidably receives the enlarged head 16 therewithin to secure the body member 20 against unwanted movement in a direction out of the drawing and towards the observer of FIG. 4. The dog 18 of the wall member 10 is vertically and received into an aligned dog recess 28A of the body member 20 to prevent or limit unwanted rotation of the body member 20 relative to the wall member 10. Optionally, the enlarged head 16 of the peg 14 of the wall member 10 is of a size such that the fit between the maximum span 14A of the enlarged head 16 is snug within the recess 26 of the body member 20 to cooperate with the dog 18 received within the aligned recess 28A to further prevent or limit unwanted rotation of the body member 20 relative to the wall member 10. This snug interaction is illustrated in FIG. 4A.

Figure 4A:
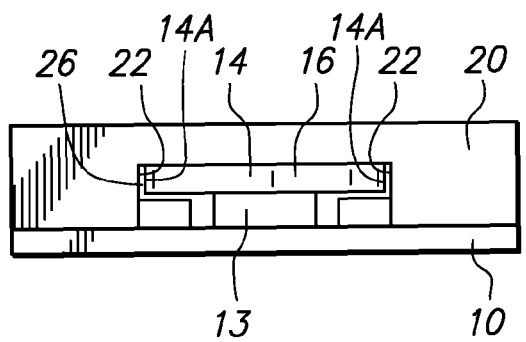
FIG. 4A is a superior cross-section view of FIG. 4 to reveal the docking interaction of the enlarged head on the peg of the wall member within the recess of the body member.

FIG. 4A is a bottom view of the docked game hanging apparatus comprising a body member 20 docked on a wall member 10 illustrated in FIG. 4 to reveal the docking interaction of the enlarged head 16 on the peg 14 of the wall member 10 within the recess 26 of the body member 20. The maximum span 14A of the enlarged head 16 fits snugly into the recess 26 to cooperate with the dog 18 (not shown in FIG. 4A—see FIG. 4) of the wall member 10 received into the aligned dog recess 28A (not shown in FIG. 4A—see FIG. 4) of the body member 20 to prevent or limit unwanted rotation of the body member 20 relative to the wall member 10 and to thereby maintain an orientation of a display as it is set by the user.

Figure 5:
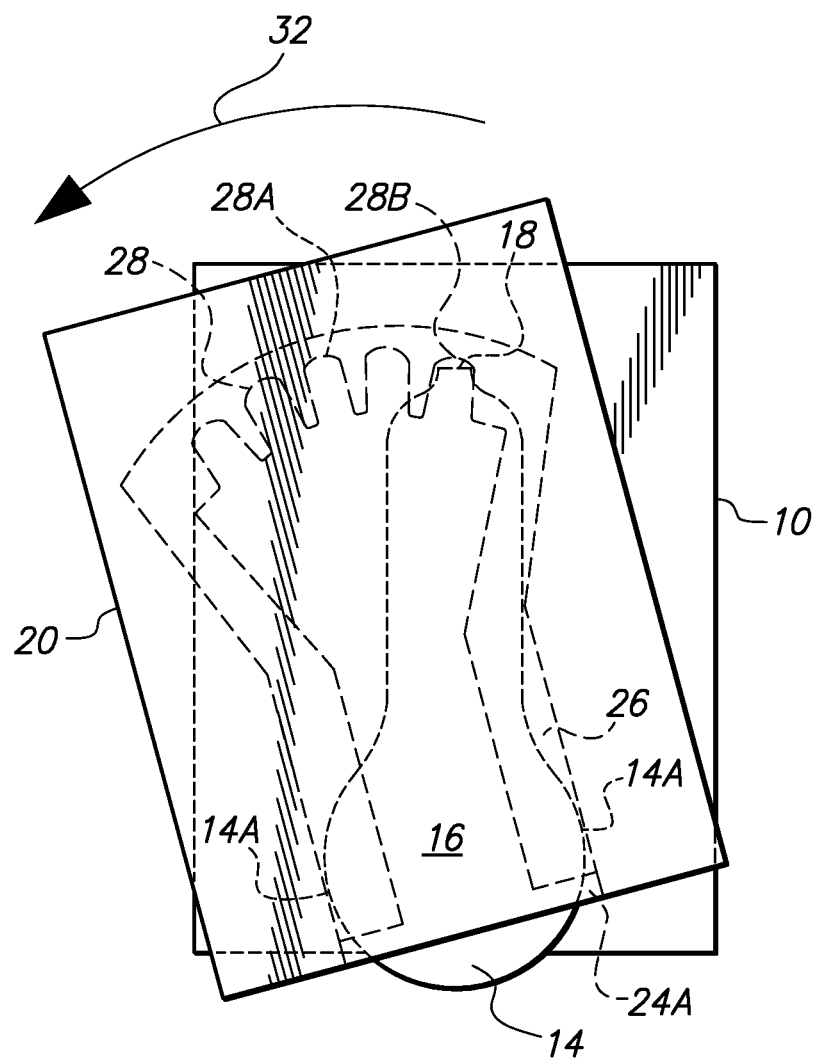
FIG. 5 is an elevation view of an alternative orientation for docking of the body member on the wall member to receive the dog of the wall member into a second of the dog recesses on the body member.

An advantage of the game hanging apparatus and method of the invention over conventional game hanging apparatuses and methods is illustrated in FIG. 5. For reasons described above in the BACKGROUND section, the optimal alignment of a body (not shown in FIGS. 1-5—see FIGS. 6 and 7) with a support structure may not be achieved upon securing of a first component of a game hanger to the body. The optimal alignment of the body may require adjustment of the game hanging apparatus after the body is in position on a support structure so that it can be observed from a distance and adjusted thereon. For example, if the body were observed to be misaligned towards a clockwise orientation and in need of counterclockwise adjustment towards an optimal alignment, conventional game hangers would require removal of a component from the body and re-securing of the component to the body in a modified orientation, or removal of a component from a support structure and re-securing of the component to the support structure in a modified orientation. FIG. 5 illustrates the capacity of the game hanging apparatus of the invention to be adjusted to obtain optimal orientation of a body on a support structure without complete disengagement of the body from the support structure and without removal of any component of the device from either the body or the support structure.

FIG. 5 is an elevation view of an alternative orientation for docking of the body member 20 on the wall member 10 to receive the dog 18 of the wall member 10 into an aligned dog recess 28B other than the previously aligned dog recess 28A on the body member 20. The docked arrangement of the body member 20 on the wall member 10 illustrated in FIG. 5 may be obtained by, for example, displacing the body member 20 shown in FIG. 4 upwardly relative to the body member 10 an amount sufficient to withdraw the dog 18 from the previously aligned dog recess 28A, rotating the body member 20 in a counterclockwise direction indicated by the arrow 32 shown in FIG. 5 and then moving the body member 20 in a direction to receive the dog 18 into the now-aligned dog recess 28B. The maximum span 14A of the enlarged head 16 of the peg 14 of the wall member 10 is again snugly received within the recess 26 to cooperate with the dog 18 received into the now-aligned dog recess 28B to prevent or limit rotation of the body member 20 relative to the wall member 10 and to thereby maintain the modified orientation of the body (not shown) to which the body member 20 is mounted for display.

Figure 6:
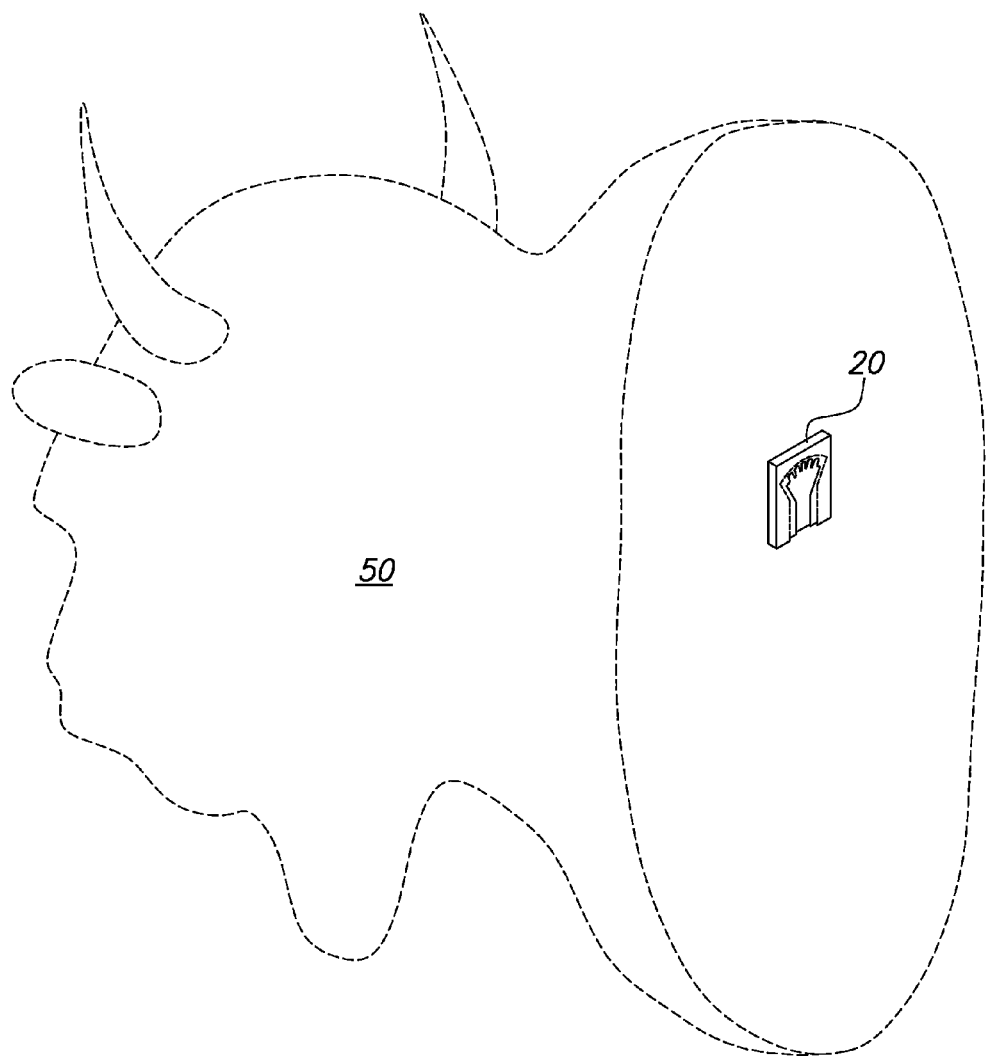
FIG. 6 is a perspective view of the embodiment of the body member of FIG. 2 after it is mounted on a portion of a body to be displayed on a support structure using the apparatus and method of the invention.

FIG. 6 is a perspective view of the embodiment of the body member 20 of FIG. 2 after it is mounted on a wall portion of a body 50 to be displayed on a support structure (not shown) using the apparatus and method of the invention. It will be understood that in the case of a bison's head, as illustrated in FIG. 6, the body 50 to be displayed using the apparatus and method of the invention may weigh over 200 pounds (90.8 kg).

Figure 7:
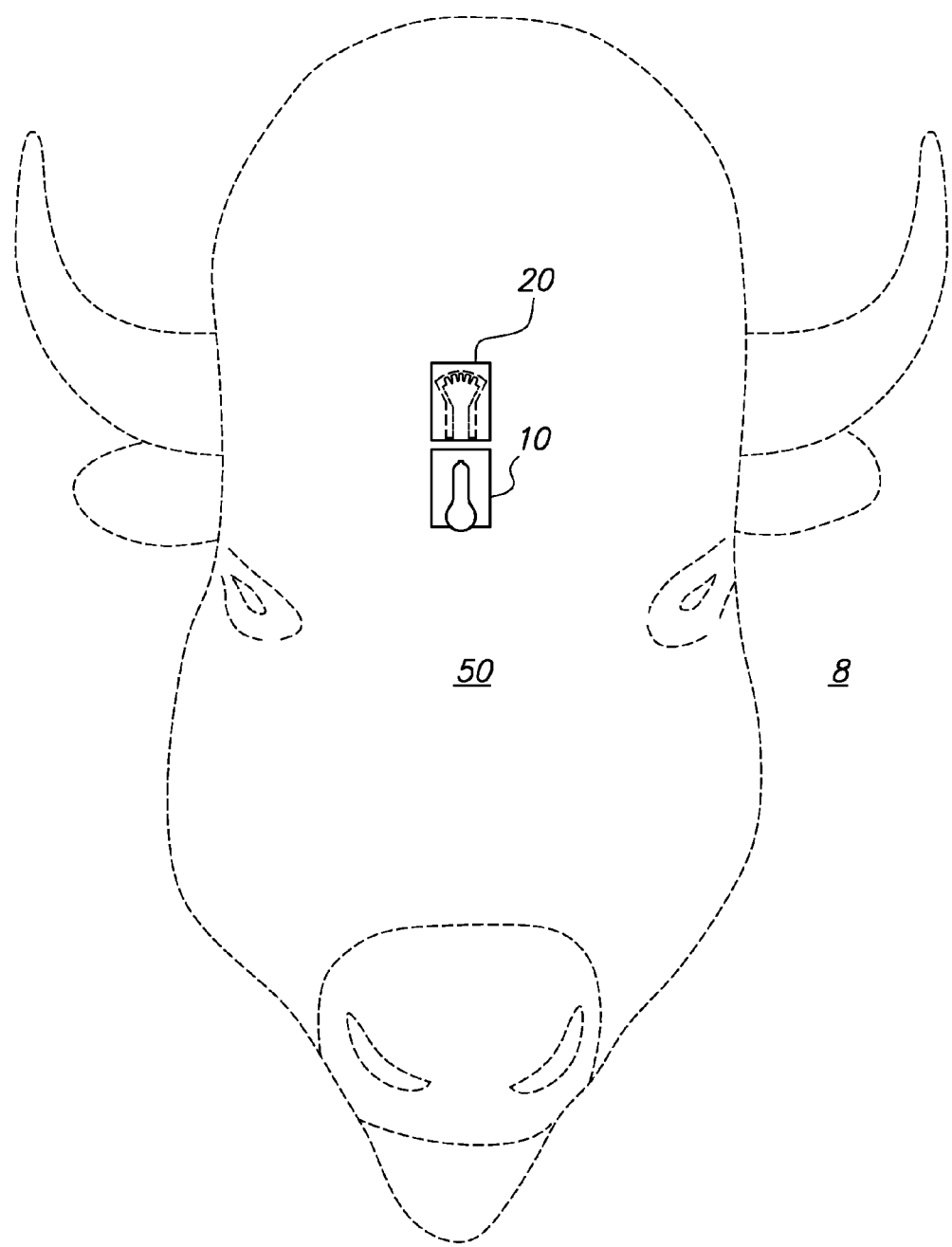
FIG. 7 is an elevation view of the body of FIG. 6 during the process of hanging the body on a support structure on which the wall member is mounted. The wall member and the body member are generally arranged as illustrated in FIG. 3.

FIG. 7 is an elevation view of the body 50 of FIG. 6 shown in dotted lines to reveal the position of the body member 20 secured thereto and aligned with the wall member 10 secured to the support structure 8 to facilitate the process of hanging the body 50 on the support structure 8 for display. The body member 20 and the wall member 10 are generally aligned as illustrated in FIG. 3 and may be docked, one with the other, in an arrangement as illustrated in FIG. 4 or FIG. 5. It will be understood that, while FIG. 5 illustrates a step of adjustment of the game hanging apparatus to reorient the body 50 toward a counterclockwise direction, the game hanging apparatus may be adjusted using a similar step to reorient the body 50 toward the toward the clockwise direction.

In one embodiment, the throat 24A of the bay opening 22 of the body member 20 may be convergent or tapered so that it receives the saddle portion 13 of the peg 14 intermediate the enlarged head 16 and the base member 12 of the wall member 10 so that the throat 24A fits onto the saddle portion 13 of the peg 14 intermediate the enlarged head 16 and the base member 12 in a self-tightening arrangement like a saddle on a horse as the load on the body member 20 is transferred to the wall member 10. In another embodiment, the saddle portion 13 of the peg 14 intermediate the enlarged head 16 and the base member 12 is convergent or tapered so that it receives the throat 24A of the bay opening 22 of the body member 20 in a self-tightening arrangement like a supporting body receiving a saddle on a horse as the load on the body member 20 is transferred to the wall member 10.

Figure 8:
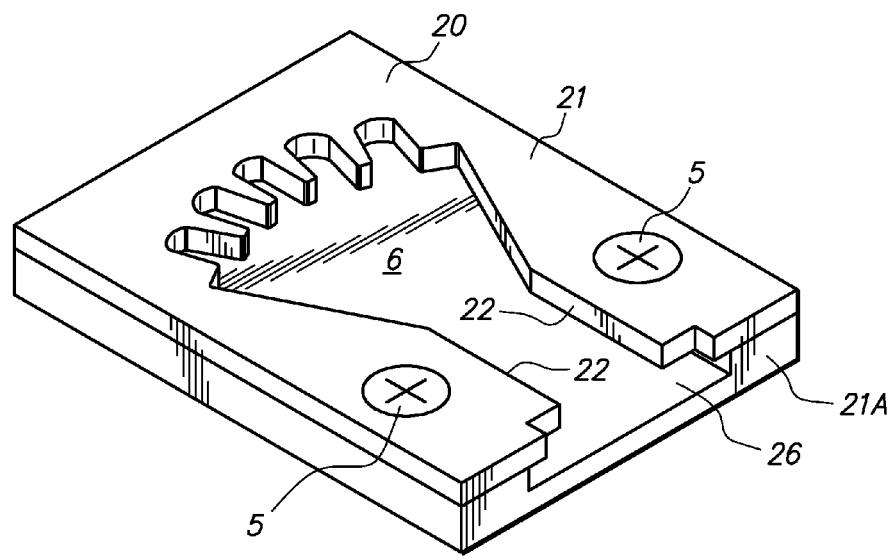
FIG. 8 is an alternate embodiment of the body member 20 of FIG. 2.

FIG. 8 is an alternate embodiment of the body member 20 of FIG. 2 comprising a body plate 21 into which the bay opening 22 and dog recesses 28 have been machined and a recess member 21A into which the recess 26 has been machined. The body plate 21 is coupled to the recess member 21A using fasteners such as, for example, screws 5. This alternative embodiment may be used in place of an integrally formed wall member 20 like that illustrated in FIG. 2 to reduce manufacturing costs.

Figure 9:
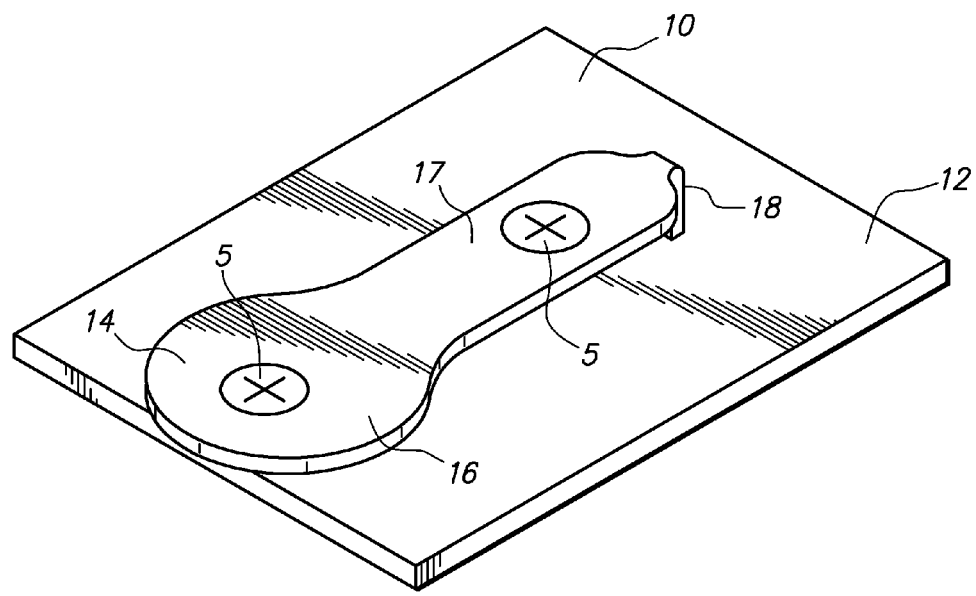
FIG. 9 is an alternate embodiment of the wall member 10 of FIG. 1.

Similarly, FIG. 9 is an alternate embodiment of the wall member 10 of FIG. 1 comprising a plate 17 having the enlarged head 16 of the peg 14 and the dog 18 and coupled to a base member 12 using fasteners such as, for example, screws 5. The saddle portion 13 (not shown in FIG. 3—see FIG. 4A) of the peg 14 intermediate the enlarged head 16 and the base portion 12 may comprise, for example, a spacer (not shown in FIG. 3—see FIG. 4A) to support the wall plate 17 in a spaced apart relationship to the base member 12.

The term "peg," as that term is used herein, means a structure that is adapted for being received within the bay opening, and may comprise, but is not limited to, an isolated post, pin, protrusion or other protruding structure. As in the embodiment illustrated in the drawings, a "peg," as that term is used herein, may comprise a portion of a larger structure that may include other structures.

It should be understood that the term "wall member," as that term is used herein, does not imply that the wall member is necessarily secured to a wall or directly secured to a wall. Similarly, the term "body member," as that term is used herein, does not imply that the body member is necessarily secured to a taxidermied body or directly secured to a taxidermied body. The body member may be secured to any object or article to be hung relative to a support structure, and the invention is not limited to hanging taxidermied bodies.

The combination of the wall member and the body member comprise the apparatus of the invention, and that the method of hanging a body relative to a support structure may also comprise disposing the body member on a support structure and disposing a wall member on a body. It is the step of coupling the body member and the wall member one to the other in a manner that facilitates re-orientation or re-positioning of a body relative to the support structure that is the core of the invention, and this result may be obtained by juxtaposition of the two components of the apparatus of the invention without substantial loss of the benefit of the apparatus and the method.

The body member may comprise, in other embodiments, either fewer or more generally aligned recesses to provide fewer or more possible orientations of the body to which a body member is secured relative to the support structure to which the wall member is secured. The minimum number of generally aligned recesses for an adjustable embodiment of the game hanging apparatus is two.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

I claim:

1. An apparatus to hang a body on a support structure, comprising:
   a first member having a wall member, securable to a support structure using fasteners, a dog, proximal a first end of the first member, a peg that is proximal a second end of the first member with an enlarged head having a span and a center within the span that is spaced apart from the dog, and a saddle portion intermediate the enlarged head of the peg and an adjacent surface of the wall member to which the peg is secured, the saddle portion having a span that is smaller than the span of the adjacent head of the peg; and
   a second member having a body member securable to a body to be hung on the support structure, a plurality of generally adjacent dog recesses to receive the dog of the first member therein, and a bay with a bay opening, a throat that has a width that is wider than the span of the head of the peg, and a recess intermediate the bay opening and a adjacent surface of the body member;
   wherein the dog of the first member is spaced from the peg of the first member by a distance that exceeds the width of the throat of the bay of the second member;
   wherein the enlarged head of the peg of the first member is receivable into the throat and within the bay opening of the bay of the second member;
   wherein the saddle portion of the peg is receivable within the throat of the bay; and
   wherein the dog of the first member is spaced-apart from the saddle portion of the peg and the dog recesses are spaced-apart from the throat of the bay such that the dog of the first member is alignable with and receivable within at least one of the plurality of dog recesses of the second member as the saddle portion of the first member is received within the throat of the bay of the second member to rotatably secure the second member to the first member; and
   wherein the enlarged head of the peg is angularly rotatable, within a limited range, within the throat of the bay of the second member to allow the dog of the second member to be received into any one of the plurality of generally adjacent dog recesses of the second member to provide a range of orientations in which the body, secured to the second member, can be hung by engagement of the second member with the first member, secured to a support structure.

2. The apparatus of claim 1 wherein the plurality of dog recesses open to the bay opening of the second member.

3. The apparatus of claim 1 wherein the body member of the second member has a plate comprising the bay opening and the plurality of generally adjacent dog recesses.

4. The apparatus of claim 1 wherein the first member comprises the wall member coupled to the peg with an enlarged head that is integrally formed with the dog.

5. The apparatus of claim 1 wherein the throat is generally convergent to provide a self-tightening fit of the second member on the first member.

6. The apparatus of claim 1 wherein the first member comprises as generally flat surface opposite the peg and the dog.

7. The apparatus of claim 5 wherein the saddle portion of the peg of the first member comprises a divergent structure to receive the convergent throat thereon.

8. An apparatus to hang a body on a support structure comprising:
   a first member securable to a support structure and having a dog and a peg with an enlarged head and an adjacent saddle portion; and
   a second member releasably connectable to the first member and comprising a plurality of generally adjacent dog recesses, a bay, a bay opening, a throat, a recess adjacent the bay opening, the second member being securable to the body;
   wherein the dog of the first member is spaced from the peg of the first member by a distance that exceeds a width of the throat of the bay of the second member;
   wherein the enlarged head of the peg of the first member is receivable within the recess to dispose the saddle portion within the bay opening; and
   wherein the dog is alignable with and receivable within at least one of the plurality of dog recesses as the saddle portion is received within the throat of the bay;
   wherein the enlarged head of the peg is angularly rotatable, within a limited range, within the recess of the bay of the second member to allow the dog of the second member to be received into any one of the plurality of generally adjacent dog recesses of the second member to provide a range of orientations in which the body, secured to the second member, can he hung by engagement of the second member with the first member, secured to a support structure.

9. The apparatus of claim 8 wherein the plurality of dog recesses open to the bay opening of the second member.

10. The apparatus of claim 8 wherein the second member further comprises a body member having a plate comprising the bay opening and the plurality of generally adjacent dog recesses.

11. The apparatus of claim 8 wherein the first member further comprises a wall member coupled to the peg and the enlarged head of the peg is integrally formed with the dog.

12. The apparatus of claim 8 wherein the throat is generally convergent to provide a self-tightening fit of the second member on the first member.

13. The apparatus of claim 8 wherein the first member comprises a generally flat surface opposite the peg and the dog.

14. The apparatus of claim 12 wherein the saddle portion comprises a divergent structure to receive the convergent throat.

15. The apparatus of claim 14 wherein the second member is releasably connectable to the first member by receiving the throat onto the saddle portion and the dog into at least one of the dog recesses.

* * * * *